M. MALLORY.
SHOCK ABSORBER.
APPLICATION FILED SEPT. 2, 1919.
1,332,739.
Patented Mar. 2, 1920
2 SHEETS—SHEET 1.
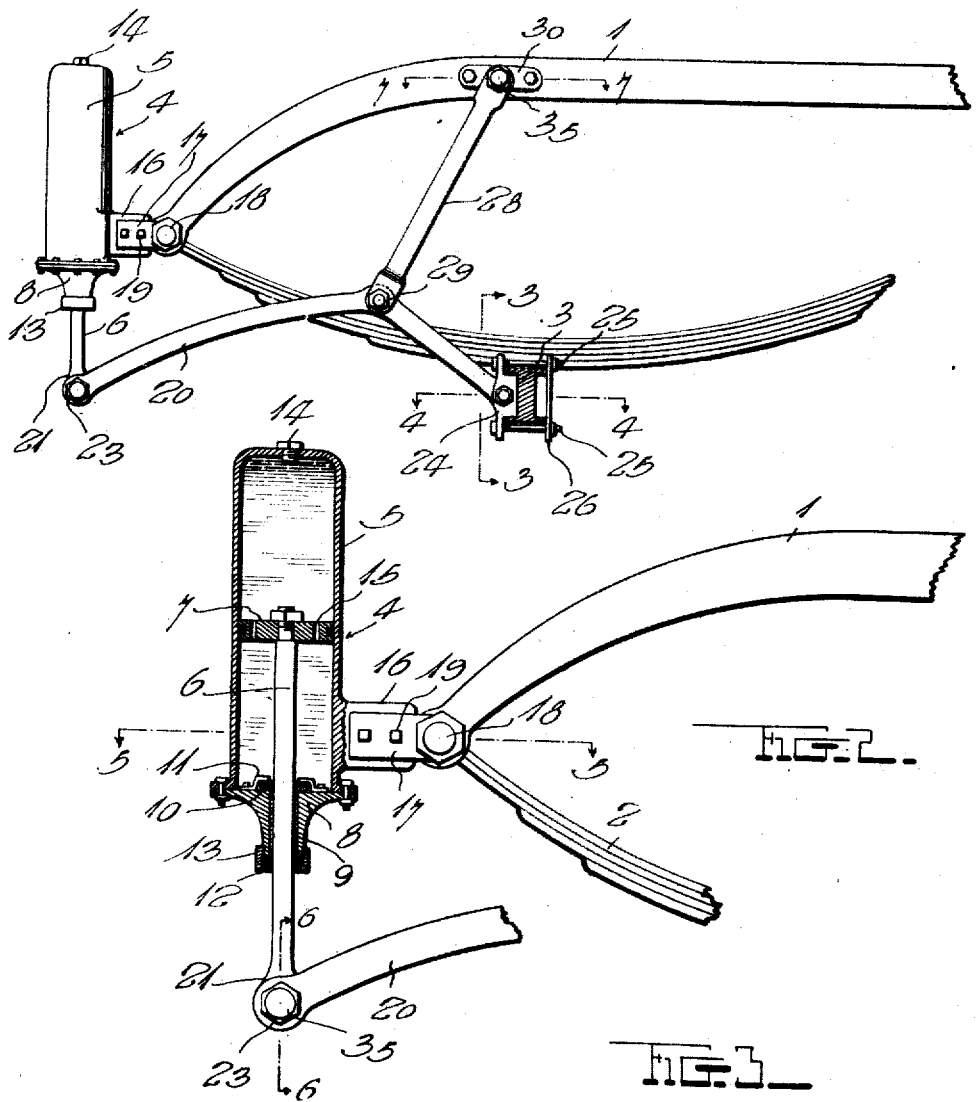
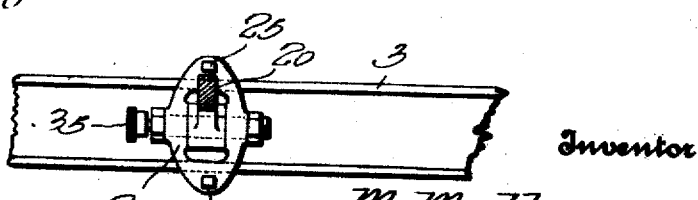
Witness
H. Woodard
Inventor
M. Mallory

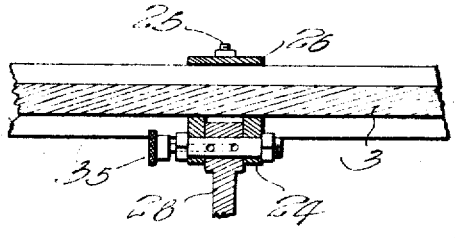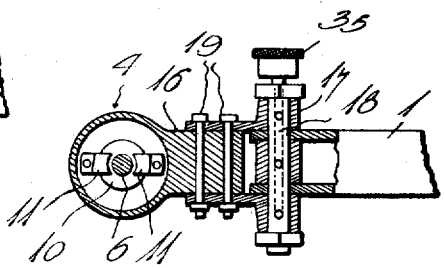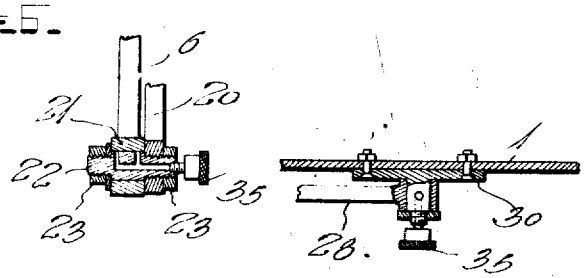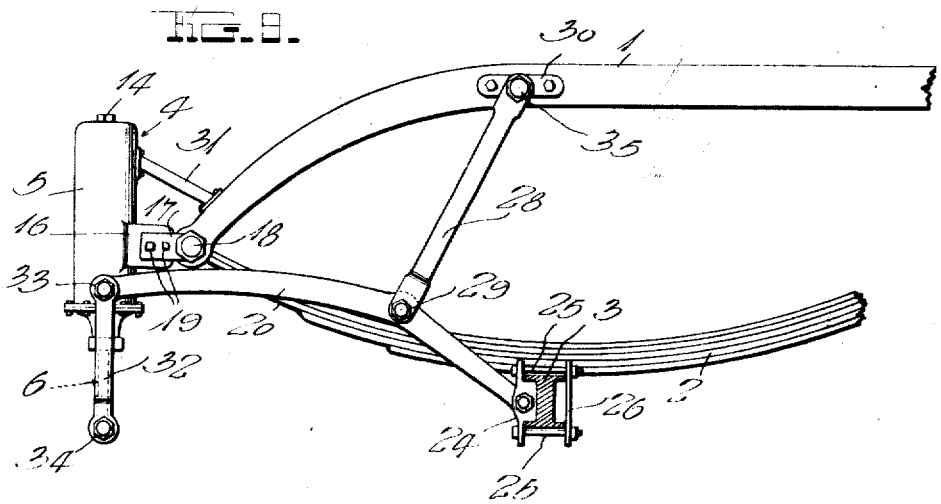

UNITED STATES PATENT OFFICE.

MARION MALLORY, OF WICHITA, KANSAS.

SHOCK-ABSORBER.

1,332,739.  Specification of Letters Patent.  Patented Mar. 2, 1920.

Application filed September 2, 1919. Serial No. 321,054.

*To all whom it may concern:*

Be it known that I, MARION MALLORY, a citizen of the United States, residing at Wichita, in the county of Sedgwick and State of Kansas, have invented certain new and useful Improvements in Shock-Absorbers; and I do declare the following to be a full, clear, and exact description of the invention, such as will enable others skilled in the art to which it appertains to make and use the same.

This invention relates to improvements in shock absorbers and it is especially designed for use in connection with automobiles, although it may be used for other similar purposes.

The principal object of the invention is to provide a device of the above mentioned character which is simple and effective, strong, durable and inexpensive to manufacture.

Another object of the invention is to provide a shock absorber embodying a new and novel construction of levers whereby the device will readily assume the proper position and effectively absorb variable shocks, the construction of the device being such that it may be readily and easily applied to most any style of automobiles now in use.

Other objects and advantages of the invention will be apparent during the course of the following description.

In the accompanying drawings forming a part of this specification and in which like numerals are employed to designate like parts throughout the same;

Figure 1, is a side elevation of a device constructed in accordance with my invention, illustrating the manner of attaching the same to a motor vehicle.

Fig. 2, is an enlarged view thereof, the cylinder being shown in vertical section and the levers broken away.

Figs. 3 to 7 inclusive, are views on the planes of the lines 3—3, 4—4, 5—5, 6—6 and 7—7 respectively of Figs. 1 and 2.

Fig. 8 is a view like Fig. 1, the construction of the parts being slightly different.

In the drawings, wherein for the purpose of illustration is shown a preferred form of my invention the numeral 1 indicates a chassis bar or side-bar of an automobile to which is secured the usual spring 2, and axle 3, the parts being of the usual construction and freely movable with respect to each other, Inasmuch as the construction of my device, as illustrated in Figs. 1 and 2, is slightly different from that shown in Fig. 8, I will first set forth the arrangement of parts as shown in Figs. 1 and 2, in which 4 indicates as a whole a cushioning device. This cushioning device includes a cylinder 5, within which a piston-rod and piston-head, 6 and 7, are movable. The lower end of the cylinder is preferably closed by a flanged head 8 which is bolted thereto and through which extends a central bore into which the bushing 9 is snugly fitted. Leakage between the piston rod 6 and bushing 9 is further prevented by use of packing members 10, held in place by the fingers 11 and also by the packing ring 12 and cap 13 which close the end of the cylinder and tightly surround the piston-rod. Oil or other suitable cushioning medium is supplied to the cylinder through the screw-plug 14, at the top of the cylinder and circulates back and forth through the openings 15 in the piston-head 7. The cylinder is further provided with an outwardly extending lug or projection 16 by means of which the cylinder is pivotally mounted on the end of the chassis bar 1. The manner of this connection is more clearly shown in Fig. 5, in which I provide plates 17 which are pivotally mounted on the short axle 18 passing through one end of the chassis bar 1. Between the plates 17 is secured the lug 16 by means of the bolts 19.

Pivotally secured to the piston-rod 6 is a substantially curved lever 20. The method and manner of connection of this lever to the end of the piston-rod is more clearly shown in Fig. 6, in which the end of the piston-rod 6 is provided with an eye 21 through which the short, hollow stub axle 22 is passed. Axle 22 is threaded on its opposite ends. The extreme end of the lever 20 is threaded thereon, and the parts held together by the nuts 23. The opposite end of lever 20 is pivoted to a substantially elliptical plate 24 as more clearly illustrated in Figs. 3 and 4. In this instance it will be seen that the plate 24 projects into the space between the upper and lower flanges of the axle 3, and is secured in position by bolts 25, which extend therethrough, and then through a second plate 26 on the opposite side of the axle 3.

Secured to the lever 20 at a point between the middle and one of its ends is a link 28, One end of the link is pivoted, in a like manner to those already set forth, at 29 to the lever 20. This point of pivot serves as the bearing or point of oscillation for the lever 20 when these parts are subjected to sudden jars during the travel of the automobile over an uneven road. The opposite end of the link 28 is pivotally secured to a plate 30 bolted or otherwise fastened to the chassis bar 1, as more particularly shown in Fig. 7.

Referring now to Fig. 8. wherein the parts are assembled in a slightly different manner, it will be seen that all of the parts are the same except that instead of the cylinder 4 being free to move about a point of pivot as hereinbefore set forth, it is rigidly secured to the chassis bar 1, by an arm 31. With this construction it will therefore be necessary to provide a swinging connection or substantially flexible connection between the end of the piston 6 and end of the lever 20. To this end I preferably employ a second link 32 which is pivoted at 33 to the lever 20 and at 34 to the end of the piston rod 6 as shown in Fig. 8.

It will be seen that by a construction as above set forth that when the car strikes a rut or uneven place in the road, the chassis bar 1 and axle will be moved with respect to each other, and thus cause the lever 20 to oscillate or swing up or down on its point of bearing 29. During this movement of the lever 20 and link 28 the piston 6 will move in a direction in the cylinder to absorb the sudden jar or jolt. Such action of the piston will be caused by the oil contained in the cylinder which passes through the openings 15 in the head 7 and retards the piston thereby forming in effect a cushion for the piston. During this movement of the piston, the cylinder 5 will be free to swing about its point of pivot, and thus assume a position to permit effective working of the piston. The same effect is also gained by the arrangement of parts as set forth in Fig. 8, hence there need be no further description or explanation of the operation thereof.

As shown, all points of pivot between the various parts are in the form of short stub axles or shafts, and each axle is provided with a central bore and perforations communicating therewith whereby the parts may be kept lubricated by means of the grease cups 35 carried by each.

It is to be understood that the form of my invention herein shown and described is to be taken as a preferred embodiment of the same and various changes in the shape, size, and arrangement of parts may be resorted to without departing from the spirit of the invention or the scope of the subjoined claims.

I claim:

1. A vehicle cushioning device including a chassis bar and an axle freely movable toward and from each other; a cushioning device connected to the end of said chassis bar, a lever fulcrumed at one of its ends to said cushioning device, and a link pivoted to said lever, the opposite ends of said lever and link being pivotally secured to the axle and chassis bar, substantially as described.

2. A vehicle cushioning device including a chassis bar and an axle freely movable toward and from each other; a cylinder fixedly connected to said chassis bar, a piston movable in the cylinder, a link pivotally connected to said piston, a lever fulcrumed at one end to said link and at its opposite end to the axle, and a second link pivoted to said lever at a point beyond the center of the latter, the other end of said second link being pivoted to the chassis bar.

In testimony whereof I have hereunto set my hand.

MARION MALLORY.